(12) United States Patent
Dellinger et al.

(10) Patent No.: US 8,382,888 B2
(45) Date of Patent: Feb. 26, 2013

(54) COMPOSITION FOR USE IN EDIBLE BIODEGRADABLE ARTICLES AND METHOD OF USE

(75) Inventors: David Dellinger, Santa Barbara, CA (US); Elie Helou, Jr., Santa Barbara, CA (US)

(73) Assignee: Biosphere Industries, LLC, Carpinteria, CA (US)

( * ) Notice: Subject to any disclaimer, the term of this patent is extended or adjusted under 35 U.S.C. 154(b) by 653 days.

(21) Appl. No.: 11/285,508

(22) Filed: Nov. 21, 2005

(65) Prior Publication Data

US 2006/0110498 A1 May 25, 2006

Related U.S. Application Data

(63) Continuation-in-part of application No. 10/928,602, filed on Aug. 26, 2004, now Pat. No. 7,553,363.

(60) Provisional application No. 60/498,396, filed on Aug. 27, 2003.

(51) Int. Cl.
*C08L 97/02* (2006.01)
*C08L 3/02* (2006.01)

(52) U.S. Cl. ............. 106/162.51; 106/137.7; 106/145.1; 106/216.1

(58) Field of Classification Search ............... 106/137.7, 106/145.1, 162.51, 216.1
See application file for complete search history.

(56) References Cited

U.S. PATENT DOCUMENTS

| | | | |
|---|---|---|---|
| 1,875,482 A | 9/1932 | Nanna | |
| 3,772,076 A | 11/1973 | Keim | |
| 4,097,297 A | 6/1978 | Keene | |
| 4,545,752 A | 10/1985 | Hanamoto et al. | |
| 4,639,341 A | 1/1987 | Hanamoto et al. | |
| 4,900,242 A | 2/1990 | Maus et al. | |
| 5,025,004 A | 6/1991 | Wu et al. | |
| 5,035,981 A | 7/1991 | Kurtz et al. | |
| 5,100,586 A | 3/1992 | Jennings et al. | |
| 5,169,566 A | 12/1992 | Stucky et al. | |
| 5,205,863 A * | 4/1993 | Elion | 106/126.3 |
| 5,209,880 A | 5/1993 | Miwa | |
| 5,232,496 A | 8/1993 | Jennings et al. | |
| 5,345,069 A | 9/1994 | Grindrod | |
| 5,352,111 A | 10/1994 | Selbak | |
| 5,354,621 A | 10/1994 | Liebermann | |
| 5,356,579 A | 10/1994 | Jennings et al. | |
| 5,358,676 A | 10/1994 | Jennings et al. | |
| 5,376,320 A | 12/1994 | Tiefenbacher et al. | |
| 5,385,764 A | 1/1995 | Andersen et al. | |
| 5,412,005 A | 5/1995 | Bastioli et al. | |
| 5,453,310 A | 9/1995 | Andersen et al. | |
| 5,506,046 A | 4/1996 | Andersen et al. | |
| 5,508,072 A | 4/1996 | Andersen et al. | |
| 5,514,430 A | 5/1996 | Andersen et al. | |
| 5,523,293 A | 6/1996 | Jane et al. | |
| 5,527,387 A | 6/1996 | Andersen et al. | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,580,409 A | 12/1996 | Andersen et al. | |
| 5,580,624 A | 12/1996 | Andersen et al. | |
| 5,582,670 A | 12/1996 | Andersen et al. | |
| 5,614,307 A | 3/1997 | Andersen et al. | |
| 5,618,341 A | 4/1997 | Andersen et al. | |
| 5,626,954 A | 5/1997 | Andersen et al. | |
| 5,631,052 A | 5/1997 | Andersen et al. | |
| 5,631,053 A | 5/1997 | Andersen et al. | |
| 5,631,097 A | 5/1997 | Andersen et al. | |
| 5,635,292 A | 6/1997 | Jennings et al. | |
| 5,637,412 A | 6/1997 | Jennings et al. | |
| 5,641,584 A | 6/1997 | Andersen et al. | |
| 5,654,048 A | 8/1997 | Andersen et al. | |
| 5,658,603 A | 8/1997 | Andersen et al. | |
| 5,658,624 A | 8/1997 | Anderson et al. | |
| 5,660,900 A | 8/1997 | Andersen et al. | |
| 5,660,903 A | 8/1997 | Andersen et al. | |
| 5,660,904 A | 8/1997 | Andersen et al. | |
| 5,662,731 A | 9/1997 | Andersen et al. | |
| 5,665,152 A * | 9/1997 | Bassi et al. | 106/145.1 |
| 5,665,439 A | 9/1997 | Andersen et al. | |
| 5,665,442 A | 9/1997 | Andersen et al. | |
| 5,676,905 A | 10/1997 | Andersen et al. | |
| 5,679,145 A | 10/1997 | Andersen et al. | |
| 5,679,381 A | 10/1997 | Andersen et al. | |
| 5,683,772 A | 11/1997 | Andersen et al. | |
| 5,691,014 A | 11/1997 | Andersen et al. | |
| 5,693,355 A | 12/1997 | Haas | |
| 5,695,811 A | 12/1997 | Andersen et al. | |
| 5,702,787 A | 12/1997 | Andersen et al. | |

(Continued)

FOREIGN PATENT DOCUMENTS

| | | |
|---|---|---|
| EP | 0752209 A1 | 1/1997 |
| EP | 0880896 A1 | 12/1998 |

(Continued)

OTHER PUBLICATIONS

Hagenmaier et al, "Wax microemulsions and citrus coatings" J, Agri, Food Chem, 42, pp. 899-902 (1994).*
"Edible" entry from Wiktionary.com, accessed Mar. 12, 2010.*
International Search Report for International Application No. PCT/US04/19619 dated Nov. 27, 2006 (5 pages).
International Search Report for International Application No. PCT/US04/27824 dated Feb. 20, 2007 (4 pages).
Ducey et al., "Alkaline Sizing Applications Surge Ahead," Alkaline Paper Advocate, Oct. 1996.
International Search Report for International Application No. PCT/US06/42800 dated May 2, 2007 (2 pages).

(Continued)

*Primary Examiner* — David M Brunsman
(74) *Attorney, Agent, or Firm* — Perkins Coie LLP

(57) ABSTRACT

One embodiment of the present invention is a composition for use in making edible biodegradable containers comprising water, pregelatinized and native starch, a first protein or natural polymeric compound, natural fibers, a wax emulsion, a mold release agent, a flavoring agent, and a coloring agent, wherein the composing consisting essentially of food grade materials.

42 Claims, No Drawings

U.S. PATENT DOCUMENTS

| | | |
|---|---|---|
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,783,240 A | 7/1998 | Wenger et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,922,379 A | 7/1999 | Wang |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,083,586 A | 7/2000 | Anderson et al. |
| 6,090,195 A | 7/2000 | Andersen et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,214,399 B1 | 4/2001 | Garbo |
| 6,220,849 B1 | 4/2001 | Atake |
| 6,228,898 B1 * | 5/2001 | Nakanishi .................. 521/82 |
| 6,231,970 B1 | 5/2001 | Andersen et al. |
| 6,240,836 B1 | 6/2001 | Garbo |
| 6,277,899 B1 | 8/2001 | Bastioli et al. |
| 6,347,934 B1 | 2/2002 | Andersen et al. |
| 6,379,446 B1 | 4/2002 | Andersen et al. |
| 6,413,069 B2 | 7/2002 | Oono et al. |
| 6,494,704 B1 | 12/2002 | Andersen et al. |
| 6,585,859 B1 | 7/2003 | Hakansson |
| 6,589,327 B1 | 7/2003 | Snidow |
| 6,846,573 B2 | 1/2005 | Seydel |
| 6,878,199 B2 * | 4/2005 | Bowden et al. ............ 106/162.5 |
| 7,083,673 B2 | 8/2006 | Bowden et al. |
| 7,196,124 B2 | 3/2007 | Parker et al. |
| 7,553,363 B2 | 6/2009 | Dellinger |
| 7,776,416 B2 | 8/2010 | Kinard et al. |
| 2003/0047110 A1 | 3/2003 | Poovarodom et al. |
| 2003/0143417 A1 | 7/2003 | Kesselring et al. |
| 2003/0216492 A1 | 11/2003 | Bowden et al. |
| 2004/0265453 A1 | 12/2004 | Helou, Jr. et al. |
| 2005/0089606 A1 | 4/2005 | Dellinger et al. |
| 2006/0057319 A1 | 3/2006 | Gleich et al. |
| 2006/0075544 A1 | 4/2006 | Kriesel et al. |
| 2006/0229207 A1 | 10/2006 | Mentink et al. |
| 2006/0255507 A1 | 11/2006 | Bowden et al. |
| 2007/0021534 A1 | 1/2007 | Glenn et al. |
| 2007/0243346 A1 | 10/2007 | Kim |
| 2007/0254970 A1 | 11/2007 | Kitamura |
| 2010/0311874 A1 | 12/2010 | Mentink et al. |

FOREIGN PATENT DOCUMENTS

| | | |
|---|---|---|
| JP | 08-081565 | 3/1996 |
| JP | 10-245792 | 9/1998 |
| JP | 11-222794 | 8/1999 |
| WO | 92/10938 A1 | 7/1992 |
| WO | 97/23333 A | 7/1997 |
| WO | 99/45073 A | 9/1999 |
| WO | 00/39213 A | 6/2000 |
| WO | 00/39215 A | 7/2000 |
| WO | 2005021633 | 10/2005 |

OTHER PUBLICATIONS

U.S. Patent and Trademark Office; International Search Report and Written Opinion for International Application No. PCT/US08/80979, mailed Dec. 24, 2008.

European Patent Office, Supplementary European Search Report for EP Application 04782322, dated Jun. 10, 2009.

European Patent Office, Examination Report for EP Application 0478322.4, dated Sep. 23, 2009.

European Patent Office, Supplementary European Search Report for EP Application 06827369, dated Oct. 7, 2009.

Japanese Patent Office, English translation of Dec. 8, 2009 Office Action for Japanese Patent Application No. 2006-524867.

United States Patent and Trademark Office, International Search Report and Written Opinion for PCT/US10/021537, Mar. 2, 2010.

United States Patent and Trademark Office, International Search Report and Written Opinion for PCT/US10/021668, Mar. 9, 2010.

United States Patent and Trademark Office, International Search Report and Written Opinion for PCT/US10/030124, Jun. 4, 2010.

United States Patent and Trademark Office; International Search Report and Written Opinion for International Patent Application No. PCT/US08/69266, mailed Oct. 2, 2008.

United States Patent & Trademark Office; International Search Report and Written Opinion for PCT Application No. PCT/US07/88989, mailed Apr. 18, 2008.

European Patent Office; Supplemental Search Report for European Patent Application No. 04755659.2, mailed Jul. 28, 2008.

* cited by examiner

COMPOSITION FOR USE IN EDIBLE BIODEGRADABLE ARTICLES AND METHOD OF USE

CROSS-REFERENCE TO RELATED APPLICATIONS

This application is a continuation-in-part of U.S. patent application Ser. No. 10/928,602, filed Aug. 26, 2004, now U.S. Pat. No. 7,553,363 which claims priority to Provisional Application Ser. No. 60/498,396, filed Aug. 27, 2003, both of which are incorporated herein by reference.

BACKGROUND OF THE INVENTION

1. Field of the Invention

The invention generally relates to a mix formulation for the production of edible, biodegradable, and compostable food packaging and service items and methods for use of said formulations.

2. Background

Conventional disposable food service items are commonly made from paper or paperboard (commonly coated or impregnated with a polymeric water-proofing material such as wax or polyethylene), or one of a variety of plastics (polystyrene is the most common). In addition, ovenable disposables are made from aluminum or CPET, commonly known as dual ovenable plastic.

During the introduction of Biosphere biodegradable compostable products, it was found that children often expressed a desire to eat the articles presented. When asked, adults also expressed an interest in edible packaging or food-service items. Edible, starch-based food service items which were greeted with considerable public enthusiasm at the 1994 Winter Olympic Games in Lillehammer, Norway; after use, those items were fed to livestock, eliminating a large source of waste. Home and industrial bakers have expressed a desire for edible molding devices for cakes, cupcakes, muffins, tarts, pies, and the like, to replace the metal and paper items currently in use.

In addition to the intrinsic appeal of edible packaging materials to children and other consumers, there is a growing recognition that the environmental costs of using "cheap" plastic materials for packaging may be quite high. The expected lifetime of a polystyrene cup, for example, is about 500 years, and each American disposes an average of about 100 cups per year. Polystyrene is made by chemical processing of benzene and ethylene, both byproducts of the petroleum industry, and thus both nonrenewable resources. Although the environmental record of the petroleum industry has improved greatly since the mid-twentieth century, extraction and processing of petroleum for fuel and chemical production remain recognized environmental problems. Questions have also been raised about the wisdom of using a limited natural resource (fossil hydrocarbon stocks) to produce disposable items (which exacerbate waste handling problems) rather than reserving the resource for production of durable goods.

United States Government sources indicate that packaging (of all types) makes up 32 percent of the municipal solid waste stream by weight. Food packaging makes up about 9 percent of the waste stream. Costs of disposal of municipal wastes are likely to increase as landfill regulations become more stringent, current sites are filled and replaced by (usually) more distant sites, and waste transportation costs increase (along with fuel costs).

Pet food packaging also contributes appreciably to the waste stream. The total annual worldwide market for pet food packaging has been estimated to exceed $500 million, with increasing emphasis on smaller packaging, including portion-sized packages. As in all industries, the smaller the quantity of product per unit sold, the greater the ratio of packaging volume to product volume; the quantity of pet food packaging being used is thus growing at a higher rate than the quantity of pet food itself.

Materials that are impervious to moisture and impermeable to oxygen and other gases include conventional plastics, metals, glass, and plastic-coated paper or paperboard. Of these, metal, glass, paperboard, and molded plastics typically provide structural protection of the packaged items as well as barrier properties, whereas plastic films and plastic-coated papers mainly provide barrier protection rather than structural protection. Typically much more mass is required to obtain the structural rigidity required of packaging than is required to obtain suitable barrier properties alone. None of these materials are biodegradable or compostable. To the extent that they enter the disposal waste stream (i.e., that they are not recycled), these materials are persistent; they will remain in landfills even where oxygen and moisture are provided to encourage biodegradation.

In addition to waste disposal concerns, some current research suggests that certain chemicals (phthalates and other plasticizers) used in the manufacture of plastics may have detrimental effects on the environment and on human reproductive systems, even at extremely low concentrations, by affecting the endocrine (hormone) system in humans and many other animal species. The observations suggest that, in both wildlife and humans, very low concentrations of these compounds can mimic or interfere with hormones that play important roles in embryonic development, resulting in effects such as hermaphroditism in gastropods; feminization of fish, alligators, and some mammals; malformations or morbidity in amphibians, fish, and birds; and various effects in human developmental and reproductive biology. Although the research and many of the conclusions that have been drawn from it are controversial, the FDA and some Japanese and European regulatory agencies are considering bans or additional regulations on certain phthalates. Regardless of how this debate is resolved in the future, there is currently increasing public concern about the safety of plastics and the plasticizers that are used to improve their physical properties.

The desire to use disposable packaging materials that are biodegradable and compostable has been steadily increasing in the last decade. As recently as March, 2003, Taiwan outlawed the use of polystyrene foam in disposable packaging. China's major cities (e.g., Beijing and Shanghai) have also outlawed the use of polystyrene foam in disposable packaging. Commenting on solid waste policy in the United States, the web site of American Society of Civil Engineers says that "the problem of over consumption should be addressed, with the goal of reducing the production and consumption of unnecessary goods, packaging and throwaways. Toxic materials used in products and packaging and produced as byproducts in production processes should be minimized."

Unlike plastics, paper and paperboard are made from wood pulp, which is a renewable material. The regeneration time, however, for wood fiber—the time required to grow a tree—is substantial, and the chemical processing needed to produce white ("bleached") fibers has been recognized to be detrimental to the environment. The use of unbleached and recycled fibers helps alleviate these environmentally detrimental activities, but the use of slow-growing trees as a fiber source when many agricultural byproduct sources are available is in itself questionable.

Further, in the current art, starch-based food service articles typically contain two or three major phases: a matrix material (mainly starch) that contains inorganic filler materials and/or fibrous materials. The mechanical properties of the starch matrix material are critical to the performance of these articles. Baked unmodified starch is typically quite fragile and brittle when dry, but relatively soft and pliable when the starch contains 5% to 10% moisture. In current practice, fiber is often added to the formulation to increase the flexural strength and fracture energy of starch-based items, especially during the period immediately after demolding, when the moisture content of the starch is very low. Even with the addition of significant amounts (10% or more) of fiber, however, starch-based articles are commonly very brittle immediately after demolding or when stored for extended periods in dry environments (heated buildings in winter, air conditioned buildings in summer, desert environments any time of year). Brittle failure of starch-based articles thus continues to present problems during the manufacturing process (especially before coatings or laminated films are applied) and when the articles are used in dry environments.

Moreover, in the current art, inorganic mineral fillers (e.g., calcium carbonate, silica, calcium sulfate, calcium sulfate hydrate, magnesium silicate, micaceous minerals, clay minerals, titanium dioxide) are often included in formulations used to produce starch-based biodegradable food service articles. These fillers are not, however, biodegradable. Marketing claims made for products using these materials as fillers point out that the materials are natural, renewable, and environmentally benign. However, there are inherent environmental costs associated with the mining (or synthesis) and processing of all inorganic filler materials.

Finally, in the current art, the most commonly used fiber in starch-based food service articles is wood-pulp fiber (similar to the paper based articles). As the main source material for the paper industry, it is readily available, is consistent in quality and material properties, and has the main properties needed to serve as structural elements in the finished food service articles. The use, however, of slow-growing trees as a fiber source when many agricultural byproduct sources are available is, as set forth above, in itself questionable.

Accordingly, there is a need for an improved system for producing edible, biodegradable, and compostable disposable items that can serve the full range of uses to which containers, plates, trays, and bowls are usually put. Consumers clearly would benefit from the introduction of a new edible food service and packaging material. Society at large would clearly benefit from an overall reduction in the amount of food packaging materials in the municipal solid waste stream.

Further, there is a need to reduce the proportion of persistent, non-biodegradable food packaging in the municipal waste stream. Development of packaging systems that combine edible, compostable, and biodegradable materials for structural rigidity with minimal amounts of plastic film or plastic-coated paper for protection from water, water vapor, oxygen, and contaminants would be beneficial.

Further, development of packaging materials made entirely from natural, edible ingredients would reduce both environmental and human health effects of plasticizers, to whatever extent they are eventually shown to occur. Until the debate over the issue is resolved, edible packaging materials may serve as an alternative to plastics for concerned consumers.

There is also a need for an improvement in the current art that will replace mineral fillers with fully biodegradable and renewable plant-based organic materials that serve the same role as traditional mineral fillers. Even greater benefit is available if the filler material is currently produced as a byproduct of the production of another agricultural material.

Finally, there is also a need for methods and formulations that incorporate fibrous materials from annually grown non-wood plants, and particularly from materials that are byproducts of commodities already in production.

SUMMARY OF THE INVENTION

It is an object of some embodiments of the present invention to provide a system for producing edible, biodegradable, compostable, and disposable items that can serve as functional packaging and/or service items for ice cream and other frozen desert products; baked goods such as cakes, muffins, cookies, breads and sweetbreads; fruit, meat, and vegetable pies; pizza pies; candy products; and other products designed to be eaten by humans or animals. Such items are intended to be safe for consumption, have an appealing appearance, taste, and texture, and if disposed of rather than consumed, to be as readily biodegradable as other foodstuffs. These characteristics contrast sharply with standard food service and food packaging materials (PE, acrylic, or wax coated paperboard, PETE, HDPE, PP, PS, PVC, vinyl, metals foil products, etc.), which are not edible, palatable, or biodegradable.

It is another object of some embodiments of the present invention to provide a pet food packaging material that is edible, biodegradable, and compostable.

It is another object of some embodiments of the present invention to provide an edible, compostable, and biodegradable material as a structurally rigid internal component in a packaging system that includes a conventional exterior barrier material (e.g., plastic film or plastic-coated paper) for protection from water, water vapor, oxygen, and contaminants.

It is another object of some embodiments of the present invention to provide moldable packaging materials that have mechanical properties similar to those of molded plastic packaging items, but which are free of phthalates and other plasticizers used in the manufacture of conventional plastics.

It is another object of some embodiments of the present invention to provide fully edible, biodegradable, compostable, and renewable plant-based organic materials that serve the same role as traditional mineral fillers in starch-based food containers.

It is another object of some embodiments of the present invention to provide methods and formulations that incorporate fibrous materials from non-wood plants, and particularly from materials that are grown annually and/or are by-products of commodities already in production.

These and other aspects of some embodiments of the present invention which may become obvious to those skilled in the art through the following description of the invention are achieved by a formulation used in making starch-based goods and a method for use of said formulation.

One embodiment of the present invention is a composition comprising water; starch; natural fibrous materials; a mold release agent; flavoring agents; coloring agents; and/or wax emulsions, proteins, or other natural polymeric compounds to adjust the product properties for particular applications wherein, because the material is intended to be edible, all ingredients may be food grade materials.

DETAILED DESCRIPTION OF THE INVENTION

In order to fully understand the manner in which the above-recited details and other advantages and objects according to the invention are obtained, a more detailed description of the invention will be rendered by reference to specific embodiments thereof.

One embodiment of the present invention provides packaging material that is edible and is much stronger than standard ice cream cone formulations, while remaining functional in oven and microwave environments. Typical envisioned applications for the present embodiment include stronger ice cream cones, pie shells, muffin trays, hot dog holders, candy trays, ice cream trays, cookie holders, and dessert trays. Products with enhanced moisture resistance can be provided by coating the tray with an edible, moisture resistant coating. Where long term storage of food products requires a sealed moisture and oxygen barrier, conventional coated paper or plastic film materials can be used for barrier materials, with a rigid edible, compostable, and biodegradable insert acting to hold and protect the food items.

Pet food containers can also be produced according to the present embodiment. These containers are not only edible, but (unlike many conventional packaging materials) are safe for pets' teeth as well. This new pet edible packaging can be flavored to act as a "treat" after the pet has finished eating the meal, or served as part of the meal itself. Elimination of pet food packaging would provide pets with an additional source of dietary fiber, reduce the amount of pet food packaging material in the waste stream currently being sent to landfills, and increase the overall efficiency of pet food delivery by eliminating waste packaging material.

A formulation according to the present invention from which edible packaging items (containers, plates, trays, bowls, cones, and cups, as well as other novel shapes) can be produced is provided comprising water; starch; optionally several natural fibrous materials used in combination both as structural elements (at several size scales) in the baked items and as inexpensive organic replacements for inorganic fillers; optionally proteins and natural polymeric compounds to reduce the brittleness of the articles produced for use in dry environments and to prevent breakage immediately after forming when the items are typically dry; optionally wax emulsions to increase water-resistance of the finished items; optionally a mold release agent to reduce adhesion between baked parts and the mold system; and optionally food grade coloring and/or flavoring agents to increase the sensory appeal of the items.

Starch for use in the present embodiment may include, but is not limited to, plant sources such as tubers, roots, seeds, and or fruits of plants, and specific plants sources may include corn, potato, tapioca, rice, or wheat or similar, or animal sources, namely glycogen, although plant sources are most preferred. Further, the starch is preferably provided as a combination of both pregelatinized and uncooked starches. Preferably, pregelatinized starch has a concentration in the range of about 0% to about 30% by weight of total starch in the formulation, and more preferably 3% to 20%, and most preferably 5% to 15%. Food-grade starches (pregelatinized or uncooked) that have been modified by cross-linking, stabilization, or addition of lipophilic functional groups may be included to increase resistance of the products to softening when exposed to aqueous foods.

Proteins and natural polymeric compounds may include, but are not limited to preparations made from casein, soy protein isolate or concentrate, or similar such preparations. One such preparation can be prepared in the following three steps: 1) cooking a solution of casein or soy protein isolate in water (about 10% by weight) as per usual manufacturer's recommendations (generally, hydrating the protein by soaking, then gradually raising the temperature and pH of the solution to 180° F. and pH=9 to 9.5, then holding the solution at 180° F. for 15 minutes); 2) cooling the preparation to room temperature; and optionally, 3) adding a preservative and blending thoroughly. The preferred concentration of preservative in the preparation is about 0.1% or less, depending on the shelf life required for the protein solution, the concentration of protein required in the final product, and the limits imposed by government regulations on the dosages of preservative compounds in edible materials.

Other proteins may also be used in combination with the casein or soy protein preparation or separately to improve the water-resistant properties of the containers. For example, such proteins may include albumen, gelatin, or the like.

Several natural fibrous materials may be used in combination both as structural elements (at several size scales) in the baked items and or as inexpensive organic fillers. Fiber elements are used both to control the molding characteristics of the wet batter and to enhance the structural stability of the finished food service articles. Although there is a continuum of fiber lengths and fiber aspect ratios used in the formulation, the fibrous portion of the formulation can be in a general sense separated into three classes (based on fiber length) that serve different functions. Long or very long (4 to 25 mm or longer) fibers or composite fiber elements are used to form a meshwork that helps prevent defects from forming in the batter as it expands in the mold. Medium-length fibers (0.5 to 5 mm) also help control the flow characteristics of the wet batter, and serve to increase the toughness of the finished food service articles, preventing fracture during handling and during normal use. Short fibers (<0.5 mm) serve mainly as a means to introduce readily biodegradable material into the formulation, i.e., filler material that is more water-resistant than the starch-based matrix that contains them. (All types of fiber provide this functionality, but the presence of the medium, long, and very long fibers are required for the molding, handling and usage characteristics they provide, whereas the short fiber elements are present primarily for the contribution to water-resistance that they make.)

Optionally, the shorter fibers may be used in conjunction with, or replaced by other filler materials imparting the same advantages as the shorter fibers. For example, such filler materials may include both organic and inorganic aggregates such as calcium carbonate, silica, calcium sulfate, calcium sulfate hydrate, magnesium silicate, micaceous minerals, clay minerals, titanium dioxide, talc, etc. The concentration of aggregate and/or short fibers may be in a range from about 0% to about 25% by dry weight of the formulation, in a range from about 2.5% to about 20% by total dry weight of the formulation, in a range from about 5% to about 15% dry weight of the formulation, in a range from about 5% to about 20% by total dry weight of the formulation, or in a range from about 7% to about 17% dry weight of the formulation.

In one aspect of the present embodiment, the organic filler material may include ground walnut shells. Ground walnut shells results in fibrous mater comprising short fibers. The ground walnut shells may be used alone as the filler material or may be combined with other filler materials. When used alone the preferred concentration is about 8% by dry weight.

Fibers from several sources are typically included in the formulation. Relatively high quality fibers from grass or reed species provide the mid-length fibers that contribute most to the structural stability and resilience if the finished articles. The long to very long fibers or fiber composites may come from lightly processed agricultural byproducts, e.g., stalk or husk materials that have been chopped, ground, or milled to an appropriate size. Under appropriate processing conditions (e.g., hammer milling), these materials can also provide a considerable amount of the very short fiber that serves to replace starch and add water resistance to the finished article. Fibrous material in the form of ground nut shells (or other very hard, lignin-rich plant materials) may also serve as organic, relatively water resistant, biodegradable fibers that replace conventional filler materials.

Moreover, these other sources of fiber suitable as structural elements in starch-based food service articles are readily available. Some of these are from fast-growing plants that can be broadly characterized as grasses or reeds, such as kenaf and bamboo, which provide fiber with smaller associated environmental costs than taking fiber from trees. A growing segment of the fiber industry is based on the use of fiber from these plants. In many cases the quality and consistency of fibers taken from these plants (after processing) is as good as that provided by the wood pulp industry. In addition, fiber is also widely available as a by-product of agricultural production. Stalks, stems, and husks from cereal grains, for example, are a ready source of fibrous material that, while not as high in quality as the fiber taken from wood or the better grass species, is extremely cheap and, as a by-product, has essentially no additional environmental cost (beyond whatever environmental costs are associated with the production of the main crop).

The fibrous materials included in the formulations described here vary greatly in both fiber length and fiber aspect ratio. Overall, however, it is preferred that the materials have an average fiber length that is less than about 2 mm and an average aspect ratio that is in the range of about 5:1 to 25:1.

The preferred wax emulsions in the formulation, used to increase water-resistance, is a stable aqueous emulsion usually made of carnauba, candelilla, rice bran, paraffin, or any other food-grade wax: vegetable waxes are preferred over animal and mineral waxes, and natural waxes are preferred over synthetic varieties. The wax type is selected based on the particular application and desired properties of the final product. The emulsion is usually prepared by means of emulsifying agents and mechanical agitation. Examples of wax emulsions suitable for use in the present formulation include emulsified carnauba wax and emulsified candelilla wax. Emulsifiers include all of those permitted for food applications, including (but not limited to) sorbitan monostearate, Polysorbate 60, Polysorbate 65, Polysorbate 80, food-grade gums (e.g., arabinogalactan, carrageenan, furcelleran, xanthan), stearyl monoglyceridyl citrate, succistearin, hydroxylated lecithin, and many other compounds.

A mold release agent, or abherent, is provided to reduce adhesion between baked parts and the mold system. Examples of specific mold release agents that are suitable for use in the present formulation include, but are not limited to metal stearate compounds (e.g., aluminum, magnesium, calcium, potassium, sodium, or zinc stearates), fatty acids (e.g., oleic acid, linoleic acid, etc.) fats, oils, or similar materials, or a combination of any of the foregoing.

The coloring agents preferred for use in the present formulation are water insoluble pigment types considered safe for use in food products (e.g., iron oxides, ultramarines, chromium-cobalt-aluminum oxides, ferric ammonium ferrocyanide, ferric ferrocyanide, manganese violet, carbazole violet). Alternatively, aluminum lake colorants, water-soluble food dyes, and combinations of pigments, or combinations of pigments with lakes and/or dyes may be used for some applications.

Containers fashioned from a mix formulation according to the present invention can be of varying shape and thickness depending upon the desired use for, and properties of, the final container. For example, the containers may be fashioned into open containers such as trays, cones, pie plates, cups, or bowls, or any other useful configuration known in the art.

Further, the thickness of any portion of the container will preferably vary in the range from about 0.5 mm to about 3.2 mm, and more preferably from about 1.5 mm to about 3.0 mm, and most preferably from about 1.6 mm to about 2.5 mm. The thickness of the containers may also vary across the cross-section of the container.

In another embodiment of the present invention a biodegradable material such as an edible coating and or sealant may be applied to containers fashioned from the mix formulation. Said biodegradable material may be applied such that it permeates the inner and/or outer surfaces of the container, thereby improving water and heat resistant properties of the container. Said materials when applied as a coating, may partially or completely permeate the container matrix or a combination of a forming a coating and partially or completely permeating the container matrix.

A further embodiment of the invention is a method to produce a container or other article for use with food or beverage containers. Said method comprises providing the mix formulation set forth above; heating said mix in a mold of desired shape to form a container of a corresponding desired shape. Said method may further comprise steps set forth in U.S. patent application Ser. No. 10/608,441, filed Jun. 27, 2003, which, by reference, is incorporated herein in its entirety.

A further method according to the present invention comprises the steps of providing a mold apparatus having a cavity in the shape of a desired final product and a gap or gaps for venting vapor from the mold apparatus produced during heating or baking, heating or baking the mold apparatus, adding a mixture that is liquid or semi-liquid to the cavity of the mold apparatus prior to closing the mold apparatus and closing the mold apparatus, wherein as vapor or steam is produced in the cavity during heating or baking, the mixture is pushed by vapor or steam pressure to completely fill the cavity, and upon sufficient contact of the mixture to the heated mold apparatus a skin forms on the outer surface of the mixture, the skin being permeable or semi-permeable to the vapor or steam and the skin and gap being such that, in combination, they allow escape of steam or vapor from the cavity to the exterior of the mold apparatus but do not allow any significant amount of the mixture to escape. "Any significant amount of mixture" as referred to herein is any amount the loss of which would cause any one of the drawbacks found in the prior art in a meaningful amount, such as waste of raw materials, waste of energy needed to heat additional mixture, additional processes to remove excess material to form the final product and clogging of the gap or gaps.

The vapor escapes while the mixture is retained in the cavity because the gap is of sufficiently small size that the skin formed on the surface of the mixture from contact of the mixture with the heated mold surface, when under sufficient pressure from the steam or vapor produced during heating or baking of the mixture, allows the steam or vapor to escape through the skin and then through the gap to the exterior of the mold apparatus without rupture of the skin. Because the skin is not permeable to the mixture, which may still be liquid or semi-liquid prior to the completion of heating or baking, the mixture cannot escape from the cavity of the mold apparatus.

The aforementioned method according to the present invention allows for venting of the vapors produced during baking without significant loss of mixture and the associated drawbacks of said loss outlined above such as waste of raw materials, waste of energy needed to heat additional mixture, additional processes to remove excess material to form the final product and clogging of the gap or gaps.

The aforementioned method according to the present invention may be used to manufacture both edible baked goods and other baked products such as starch-based materials for use as food containers and the like. Mixtures for use in said method are typically water-based and include mixtures as described herein. One skilled in the art, however, will recognize that the mixtures need not be water-based, such as alcohol-based mixtures or other non-water-based mixtures. Specific examples of mixtures that may be used said method should be readily apparent to one skilled in the art and include, but are not limited to, common baking mixtures such as waffle, cookie dough, or ice cream cone batter, starch-based mixtures comprised of starch and water and mixtures comprising composite materials mixed with resins that form skins which are still permeable to the gases produced during heating or baking. Further, specific baking procedures such as heating temperature and time will vary depending upon the specific mixture to be heated or baked and should be apparent to one skilled in the art.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A composition for use in making biodegradable containers comprising:
   water;
   starch, wherein the starch comprises pregelatinized and native starch and wherein the pregelatinized starch is in a range from more than 0% to less than 30% by weight of the total starch in the composition;
   fibers, wherein the fibers comprise long fibers having a length of more than 4 mm and short fibers having a length of less than 0.5 mm;
   wherein a dispersion of the composition is such that the fibers are substantially separated from one another throughout a starch based matrix;
   a mold release agent;
   a wax emulsion; and
   a first protein or natural polymeric compound,
   wherein the composition consists essentially of food grade materials and is edible.

2. The composition of claim 1 wherein the pregelatinized starch is in a range from more than 5% to less than 20% by weight of the total starch in the composition.

3. The composition of claim 1 wherein the pregelatinized starch is in a range from more than 7% to less than 15% by weight of the total starch in the composition.

4. The composition of claim 1 wherein the first protein or natural polymeric compound comprises casein or soy protein.

5. The composition of claim 1 further comprising a second protein to improve the mechanical properties of the composition when dry.

6. The composition of claim 5 wherein said second protein further comprises albumen or gelatin.

7. The composition of claim 1 wherein the fibers comprise natural fibrous materials.

8. The composition of claim 1 wherein the fibers have an average fiber length less than about 2 mm.

9. The composition of claim 8 wherein the fibers have an average aspect ratio in the range of 5:1 to 25:1.

10. The composition of claim 1 further comprising a filler material.

11. The composition of claim 10 wherein the filler material is organic.

12. The composition of claim 10 wherein the filler material comprises calcium carbonate, silica, calcium sulfate hydrate, magnesium silicate, micaceous minerals, clay minerals, titanium dioxide or talc.

13. The composition of claim 10 wherein the filler material comprises the short fibers.

14. The composition of claim 13 wherein the filler material has a concentration less than 25% by dry weight of the composition.

15. The composition of claim 13 wherein the filler material has a concentration less than 20% and greater than 5% by dry weight of the composition.

16. The composition of claim 13 wherein the filler material has a concentration less than 17% and greater than 7% by dry weight of the composition.

17. The composition of claim 10 wherein the fibers comprise fibers from grasses or reeds.

18. The composition of claim 17 wherein the grasses or reeds are kenaf or bamboo.

19. The composition of claim 1 wherein the wax emulsion comprises a natural wax.

20. The composition of claim 19 wherein the wax emulsion comprises emulsified carnuba wax or emulsified candelilla wax.

21. The composition of claim 1 wherein the mold release agent comprises metal stearate compounds, fatty acids, talc, fats or oils.

22. The composition of claim 1 wherein the mold release agent comprises stearate compounds of aluminum, magnesium, calcium, potassium, sodium, or zinc, oleic acid, linoleic acid, talc, fats or oils.

23. The composition of claim 1 further comprising:
    a flavoring agent; and
    a coloring agent.

24. A composition for use in making biodegradable containers comprising:
    water;
    pregelatinized and native starch, wherein the pregelatinized starch is in a range from more than 0% to less than 30% by weight of the total starch in the composition;
    natural fibers, wherein the fibers comprise long fibers having a length of more than 4 mm and short fibers having a length of less than 0.5 mm;
    wherein a dispersion of the composition is such that the fibers are substantially separated from one another throughout a starch based matrix;
    a mold release agent;
    a flavoring agent; and
    a coloring agent.

25. The composition of claim 24 wherein the pregelatinized starch is in a range from more than 5% to less than 15% by weight of the total starch in the composition.

26. The composition of claim 24 further comprising a first protein or natural polymeric compound wherein the first protein or natural polymeric compound comprises casein or soy protein.

27. The composition of claim 24 further comprising a second protein to improve the mechanical properties of the composition when dry.

28. The composition of claim 27 wherein said second protein comprises albumen or gelatin.

29. The composition of claim 24 wherein the fibers have an average fiber length less than about 2 mm.

30. The composition of claim 29 wherein the fibers have an average aspect ratio in the range of 5:1 to 25:1.

31. The composition of claim 24 comprising filler material.

32. The composition of claim 31 wherein the filler material is organic.

33. The composition of claim 31 wherein the filler material comprises calcium carbonate, silica, calcium sulfate hydrate, magnesium silicate, micaceous minerals, clay minerals, titanium dioxide or talc.

34. The composition of claim 31 wherein the filler material has a concentration less than 25% by dry weight of the composition.

35. The composition of claim 31 wherein the filler material has a concentration less than 20% and greater than 5% by dry weight of the composition.

36. The composition of claim 31 wherein the filler material has a concentration less than 17% and greater than 7% by dry weight of the composition.

37. The composition of claim 24 further comprising a wax emulsion, wherein the wax emulsion comprises a natural wax.

38. The composition of claim 37 wherein the wax emulsion comprises emulsified carnuba wax or emulsified candelilla wax.

39. The composition of claim 24 wherein the mold release agent comprises a metal stearate compound, fatty acids, talc, fat or oil.

40. The composition of claim 39 wherein the metal stearate compound is selected from the group consisting of aluminum stearate, magnesium stearate, calcium stearate, potassium stearate, sodium stearate, and zinc stearate.

41. The composition of claim 39 wherein the fatty acid is selected from the group consisting of oleic acid and linoleic acid.

42. A composition for use in making biodegradable containers comprising:
water;
starch,
fibers, wherein the fibers comprise long fibers having a length of more than 4 mm and short fibers having a length of less than 0.5 mm;
a mold release agent;
a wax emulsion; and
a first protein or natural polymeric compound,
wherein the composition consists essentially of food grade materials.

\* \* \* \* \*

UNITED STATES PATENT AND TRADEMARK OFFICE
CERTIFICATE OF CORRECTION

PATENT NO.         : 8,382,888 B2  
APPLICATION NO.    : 11/285508  
DATED              : February 26, 2013  
INVENTOR(S)        : Dellinger et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this
Eighteenth Day of November, 2014

Michelle K. Lee
*Deputy Director of the United States Patent and Trademark Office*